US007024359B2

(12) United States Patent
Chang et al.

(10) Patent No.: US 7,024,359 B2
(45) Date of Patent: Apr. 4, 2006

(54) DISTRIBUTED VOICE RECOGNITION SYSTEM USING ACOUSTIC FEATURE VECTOR MODIFICATION

(75) Inventors: Chienchung Chang, Rancho Santa Fe, CA (US); Naren Malayath, San Diego, CA (US); Byron Yoshio Yafuso, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 951 days.

(21) Appl. No.: 09/773,831

(22) Filed: Jan. 31, 2001

(65) Prior Publication Data

US 2002/0103639 A1    Aug. 1, 2002

(51) Int. Cl.
*G10L 15/00* (2006.01)

(52) U.S. Cl. ............................ 704/251; 704/255
(58) Field of Classification Search ................ 704/251, 704/255; 345/727
See application file for complete search history.

(56) References Cited

U.S. PATENT DOCUMENTS

| | | | | |
|---|---|---|---|---|
| 4,926,488 A | * | 5/1990 | Nadas et al. | 704/233 |
| 5,864,810 A | * | 1/1999 | Digalakis et al. | 704/255 |
| 5,890,113 A | * | 3/1999 | Takagi | 704/231 |
| 5,956,683 A | | 9/1999 | Jacobs et al. | |
| 6,070,139 A | | 5/2000 | Miyazawa et al. | |
| 6,363,348 B1 | | 3/2002 | Besling et al. | |
| 6,421,641 B1 | * | 7/2002 | Huang et al. | 704/250 |

FOREIGN PATENT DOCUMENTS

| | | |
|---|---|---|
| EP | 0779609 A2 | 6/1997 |
| EP | 0661690 A1 | 7/1997 |

OTHER PUBLICATIONS

B. Logan: "Maximum Likelihood Sequential Adaptation," 6th European Conference on Speech Communication and Technology. EUROSPEECH '99, vol. 1 of 6, Sep. 5-9, 1999, pp. 17-20.

M.J.F. Gales: "Transformation Smoothing for Speaker and Environmental Adaptation," 5th European Conference on Speech Communication and Technology, EUROSPEECH '97, vol. 4 of 5, Sep. 22-25, 1997, pp. 2067-2070.

C.J. Leggetter, et al., "Maximum Likelihood Linear Regression for Speaker Adaptation of Continuous Density Hidden Markov Models," Department of Engineering, University of Cambridge (UK). Computer Speech and Language, Academic Press Limited, 1995. (pp. 171-185).

(Continued)

*Primary Examiner*—Daniel Abebe
(74) *Attorney, Agent, or Firm*—Philip R Wadsworth; Charles D Brown; George C Pappas

(57) ABSTRACT

A voice recognition system applies speaker-dependent modification functions to acoustic feature vectors prior to voice recognition pattern matching against a speaker-independent acoustic model. An adaptation engine matches a set of acoustic feature vectors X with an adaptation model to select a speaker-dependent feature vector modification function f( ), which is then applied to X to form a modified set of acoustic feature vectors f(X). Voice recognition is then performed by correlating the modified acoustic feature vectors f(X) with a speaker-independent acoustic model.

8 Claims, 5 Drawing Sheets

OTHER PUBLICATIONS

Jun-Ichi Takahashi, et al., "Vector-Field-Smoothed Bayesian Learning for Fast and Incremental Speaker/Telephone-Channel Adaptation," Advanced LSI Laboratory, NTT Human Interface Laboratories; Computer Speech and Language, 1997. (pp. 127-146).

* cited by examiner

DISTRIBUTED VOICE RECOGNITION SYSTEM USING ACOUSTIC FEATURE VECTOR MODIFICATION

BACKGROUND

1. Field

The present invention relates to speech signal processing. More particularly, the present invention relates to a novel method and apparatus for distributed voice recognition using acoustic feature vector modification.

2. Background

Voice recognition represents one of the most important techniques to endow a machine with simulated intelligence to recognize user voiced commands and to facilitate human interface with the machine. Systems that employ techniques to recover a linguistic message from an acoustic speech signal are called voice recognition (VR) systems. FIG. 1 shows a basic VR system having a preemphasis filter 102, an acoustic feature extraction (AFE) unit 104, and a pattern matching engine 110. The AFE unit 104 converts a series of digital voice samples into a set of measurement values (for example, extracted frequency components) called an acoustic feature vector. The pattern matching engine 110 matches a series of acoustic feature vectors with the patterns contained in a VR acoustic model 112. VR pattern matching engines generally employ Viterbi decoding techniques that are well known in the art. When a series of patterns are recognized from the acoustic model 112, the series is analyzed to yield a desired format of output, such as an identified sequence of linguistic words corresponding to the input utterances.

The acoustic model 112 may be described as a database of acoustic feature vector extracted from various speech sounds and associated statistical distribution information. These acoustic feature vector patterns correspond to short speech segments such as phonemes, tri-phones and whole-word models. "Training" refers to the process of collecting speech samples of a particular speech segment or syllable from one or more speakers in order to generate patterns in the acoustic model 112. "Testing" refers to the process of correlating a series of acoustic feature vectors extracted from end-user speech samples to the contents of the acoustic model 112. The performance of a given system depends largely upon the degree of correlation between the speech of the end-user and the contents of the database.

Optimally, the end-user provides speech acoustic feature vectors during both training and testing so that the acoustic model 112 will match strongly with the speech of the end-user. However, because an acoustic model 112 must generally represent patterns for a large number of speech segments, it often occupies a large amount of memory. Moreover, it is not practical to collect all the data necessary to train the acoustic models from all possible speakers. Hence, many existing VR systems use acoustic models that are trained using the speech of many representative speakers. Such acoustic models are designed to have the best performance over a broad number of users, but are not optimized to any single user. In a VR system that uses such an acoustic model, the ability to recognize the speech of a particular user will be inferior to that of a VR system using an acoustic model optimized to the particular user. For some users, such as users having a strong foreign accent, the performance of a VR system using a shared acoustic model can be so poor that they cannot effectively use VR services at all.

Adaptation is an effective method to alleviate degradations in recognition performance caused by a mismatch in training and test conditions. Adaptation modifies the VR acoustic models during testing to closely match with the testing environment. Several such adaptation schemes, such as maximum likelihood linear regression and Bayesian adaptation, are well known in the art.

As the complexity of the speech recognition task increases, it becomes increasingly difficult to accommodate the entire recognition system in a wireless device. Hence, a shared acoustic model located in a central communications center provides the acoustic models for all users. The central base station is also responsible for the computationally expensive acoustic matching. In distributed VR systems, the acoustic models are shared by many speakers and hence cannot be optimized for any individual speaker. There is therefore a need in the art for a VR system that has improved performance for multiple individual users while minimizing the required computational resources.

SUMMARY

The methods and apparatus disclosed herein are directed to a novel and improved distributed voice recognition system in which speaker-dependent processing is used to transform acoustic feature vectors prior to voice recognition pattern matching. The speaker-dependent processing is performed according to a transform function that has parameters that vary based on the speaker, the results of an intermediate pattern matching process using an adaptation model, or both. The speaker-dependent processing may take place in a remote station, in a communications center, or a combination of the two. Acoustic feature vectors may also be transformed using environment-dependent processing prior to voice recognition pattern matching. The acoustic feature vectors may be modified to adapt to changes in the operating acoustic environment (ambiant noise, frequency response of the microphone etc.). The environment-dependent processing may also take place in a remote station, in a communications center, or a combination of the two.

The word "exemplary" is used herein to mean "serving as an example, instance, or illustration." Any embodiment described as an "exemplary embodiment" is not necessarily to be construed as being preferred or advantageous over another embodiment.

BRIEF DESCRIPTION OF THE DRAWINGS

The features, objects, and advantages of the presently disclosed method and apparatus will become more apparent from the detailed description set forth below when taken in conjunction with the drawings in which like reference characters identify correspondingly throughout and wherein.

DETAILED DESCRIPTION

Figure 1:
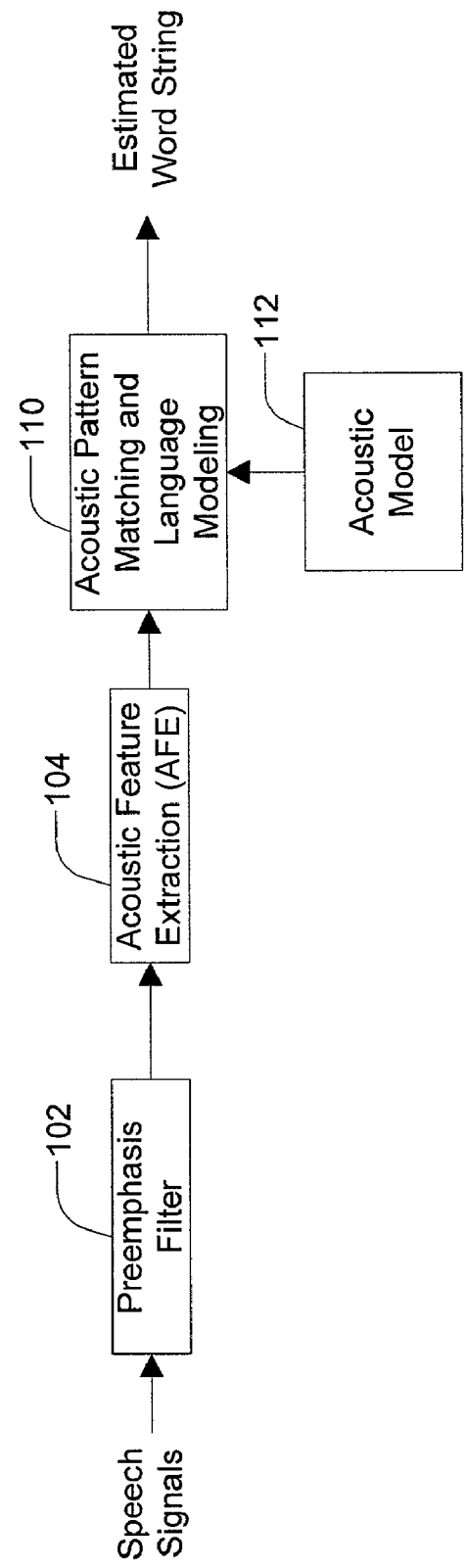
FIG. 1 shows a basic voice recognition system.

In a standard voice recognizer, either in recognition or in training, most of the computational complexity is concentrated in the pattern matching subsystem of the voice recognizer. In the context of wireless systems, voice recognizers are implemented as distributed systems in order to minimize the over the air bandwidth consumed by the voice recognition application. Additionally, distributed VR systems avoid performance degradation that can result from lossy source coding of voice data, such as often occurs with the use of vocoders. Such a distributed architecture is described in detail in U.S. Pat. No. 5,956,683, entitled "DISTRIBUTED VOICE RECOGNITION SYSTEM" and assigned to the assignee of the present invention, and referred to herein as the '683 patent.

In an exemplary wireless communication system, such as a digital wireless phone system, a user's voice signal is received through a microphone within a mobile phone or remote station. The analog voice signal is then digitally sampled to produce a digital sample stream, for example 8000 8-bit speech samples per second. Sending the speech samples directly over a wireless channel is very inefficient, so the information is generally compressed before transmission. Through a technique called vocoding, a vocoder compresses a stream of speech samples into a series of much smaller vocoder packets. The smaller vocoder packets are then sent through the wireless channel instead of the speech samples they represent. The vocoder packets are then received by the wireless base station and de-vocoded to produce a stream of speech samples that are then presented to a listener through a speaker.

A main objective of vocoders is to compress the speaker's speech samples as much as possible, while preserving the ability for a listener to understand the speech when de-vocoded. Vocoder algorithms are typically lossy compression algorithms, such that the de-vocoded speech samples do not exactly match the samples originally vocoded. Furthermore, vocoder algorithms are often optimized to produce intelligible de-vocoded speech even if one or more vocoder packets are lost in transmission through the wireless channel. This optimization can lead to further mismatches between the speech samples input into the vocoder and those resulting from de-vocoding. The alteration of speech samples that results from vocoding and de-vocoding generally degrades the performance of voice recognition algorithms, though the degree of degradation varies greatly among different vocoder algorithms.

In a system described in the '683 patent, the remote station performs acoustic feature extraction and sends acoustic feature vectors instead of vocoder packets over the wireless channel to the base station. Because acoustic feature vectors occupy less bandwidth than vocoder packets, they can be transmitted through the same wireless channel with added protection from communication channel errors (for example, using forward error correction (FEC) techniques). VR performance even beyond that of the fundamental system described in the '683 patent can be realized when the feature vectors are further optimized using speaker-dependent feature vector modification functions as described below.

Figure 2:
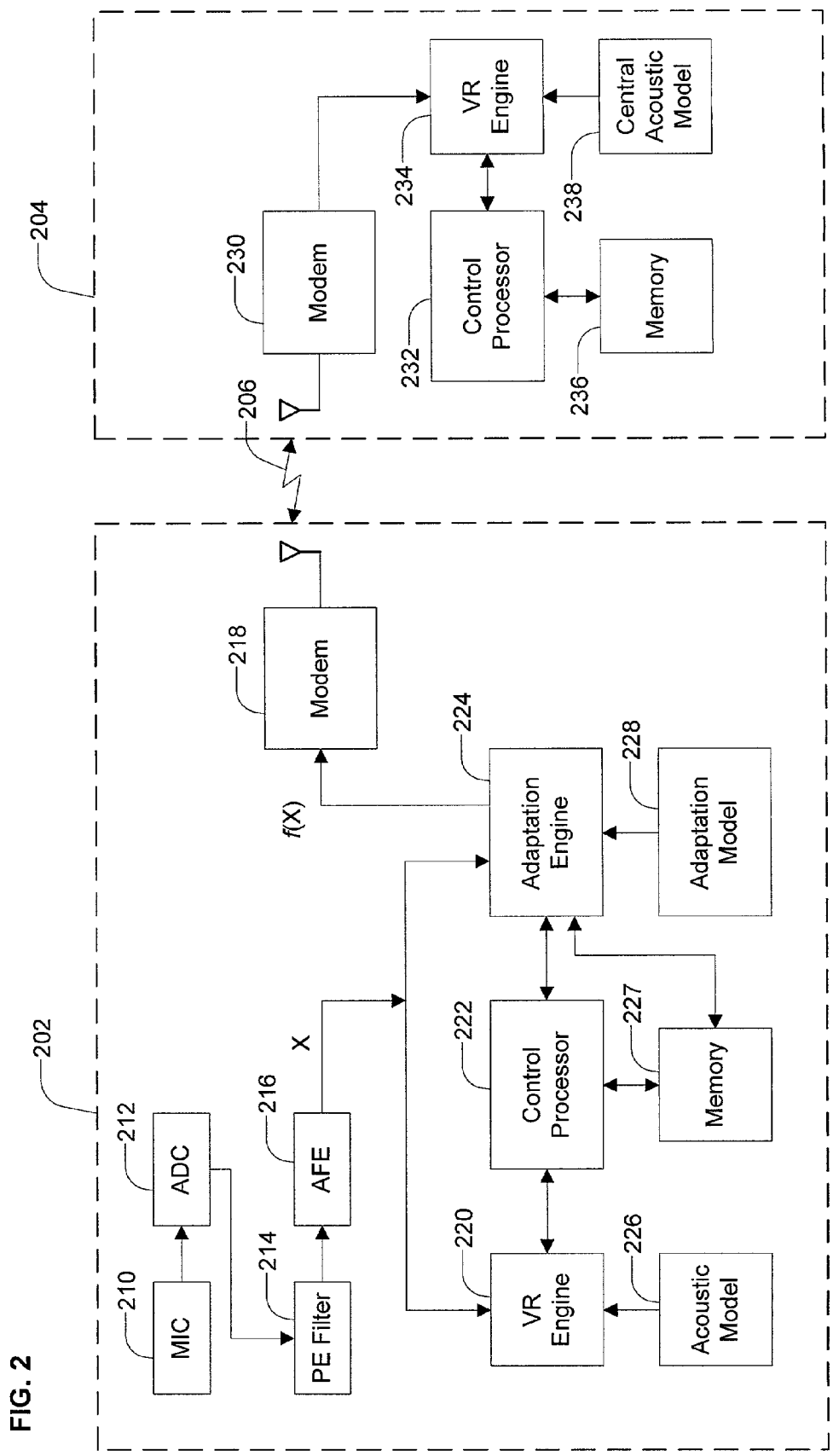
FIG. 2 shows a distributed VR system according to an exemplary embodiment.

FIG. 2 shows a distributed VR system according to an exemplary embodiment. Acoustic feature extraction (AFE) occurs within a remote station 202, and acoustic feature vectors are transmitted through a wireless channel 206 to a base station and VR communications center 204. One skilled in the art will recognize that the techniques described herein may be equally applied to a VR system that does not involve a wireless channel.

In the embodiment shown, voice signals from a user are converted into electrical signals in a microphone (MIC) 210 and converted into digital speech samples in an analog-to-digital converter (ADC) 212. The digital sample stream is then filtered using a preemphasis (PE) filter 214, for example a finite impulse response (FIR) filter that attenuates low-frequency signal components.

The filtered samples are then analyzed in an AFE unit 216. The AFE unit 216 converts digital voice samples into acoustic feature vectors. In an exemplary embodiment, the AFE unit 216 performs a Fourier Transform on a segment of consecutive digital samples to generate a vector of signal strengths corresponding to different frequency bins. In an exemplary embodiment, the frequency bins have varying bandwidths in accordance with a bark scale. In a bark scale, the bandwidth of each frequency bin bears a relation to the center frequency of the bin, such that higher-frequency bins have wider frequency bands than lower-frequency bins. The bark scale is described in Rabiner, L. R. and Juang, B. H., *Fundamentals of Speech Recognition*, Prentice Hall, 1993 and is well known in the art.

In an exemplary embodiment, each acoustic feature vector is extracted from a series of speech samples collected over a fixed time interval. In an exemplary embodiment, these time intervals overlap. For example, acoustic features may be obtained from 20-millisecond intervals of speech data beginning every ten milliseconds, such that each two consecutive intervals share a 10-millisecond segment. One skilled in the art would recognize that the time intervals might instead be non-overlapping or have non-fixed duration without departing from the scope of the embodiments described herein.

Each acoustic feature vector (identified as X in FIG. 2) generated by the AFE unit 216 is provided to an adaptation engine 224, which performs pattern matching to characterize the acoustic feature vector based on the contents of an adaptation model 228. Based on the results of the pattern matching, the adaptation engine 224 selects one of a set of feature vector modification functions f( ) from a memory 227 and uses it to generate a modified acoustic feature vector f(X).

X is used herein to describe either a single acoustic feature vector or a series of consecutive acoustic feature vectors. Similarly, f(X) is used to describe a single modified acoustic feature vector or a series of consecutive modified acoustic feature vectors.

In an exemplary embodiment, and as shown in FIG. 2, the modified vector f(X) is then modulated in a wireless modem 218, transmitted through a wireless channel 206, demodulated in a wireless modem 230 within a communications center 204, and matched against a central acoustic model 238 by a central VR engine 234. The wireless modems 218, 230 and wireless channel 206 may use any of a variety of wireless interfaces including CDMA, TDMA, or FDMA. In addition, the wireless modems 218, 230 may be replaced with other types of communications interfaces that communicate over a non-wireless channel without departing from the scope of the described embodiments. For example, the remote station 202 may communicate with the communications center 204 through any of a variety of types of communications channel including land-line modems, T1/E1, ISDN, DSL, ethernet, or even traces on a printed circuit board (PCB).

In an exemplary embodiment, the vector modification function f( ) is optimized for a specific user or speaker, and is designed to maximize the probability that speech will be correctly recognized when matched against the central acoustic model 238, which is shared between multiple users. The adaptation model 228 in the remote station 202 is much smaller than the central acoustic model 238, making it possible to maintain a separate adaptation model 228 that is optimized for a specific user. Also, the parameters of the feature vector modification functions f( ) for one or more speakers are small enough to store in the memory 227 of the remote station 202.

In an alternate embodiment, an additional set of parameters for environment-dependent feature vector modification functions are also stored in the memory 227. The selection and optimization of environment-dependent feature vector modification functions are more global in nature, and so may generally be performed during each call. An example of a very simple environment-dependent feature vector modification function is applying a constant gain k to each element of each acoustic feature vector to adapt to a noisy environment.

A vector modification function f( ) may have any of several forms. For example, a vector modification function f( ) may be an affine transform of the form AX+b. Alternatively, a vector modification function f( ) may be a set of finite impulse response (FIR) filters initialized and then applied to a set of consecutive acoustic feature vectors. Other forms of vector modification function f( ) will be obvious to one of skill in the art and are therefore within the scope of the embodiments described herein.

In an exemplary embodiment, a vector modification function f( ) is selected based on a set of consecutive acoustic feature vectors. For example, the adaptation engine 224 may apply Viterbi decoding or trellis decoding techniques in order to determine the degree of correlation between a stream of acoustic feature vectors and the multiple speech patterns in the adaptation model 228. Once a high degree of correlation is detected, a vector modification function f( ) is selected based on the detected pattern and applied to the corresponding segment from the stream of acoustic feature vectors. This approach requires that the adaptation engine 224 store a series of acoustic feature vectors and perform pattern matching of the series against the adaptation model 228 before selecting the f( ) to be applied to each acoustic feature vector. In an exemplary embodiment, the adaptation engine maintains an elastic buffer of unmodified acoustic feature vectors, and then applies the selected f( ) to the contents of the elastic buffer before transmission. The contents of the elastic buffer are compared to the patterns in the adaptation model 228, and a maximum correlation metric is generated for the pattern having the highest degree of correlation with the contents of the elastic buffer. This maximum correlation is compared against one or more thresholds. If the maximum correlation exceeds a detection threshold, then the f( ) corresponding to the pattern associated with the maximum correlation is applied to the acoustic feature vectors in the buffer and transmitted. If the elastic buffer becomes full before the maximum correlation exceeds the detection threshold, then the contents of the elastic buffer are transmitted without modification or alternatively modified using a default f( ).

The speaker-dependent optimization of f( ) may be accomplished in any of a number of ways. In a first exemplary embodiment, a control processor 222 monitors the degree of correlation between user speech and the adaptation model 228 over multiple utterances. When the control processor 222 determines that a change in f( ) would improve VR performance, it modifies the parameters of f( ) and stores the new parameters in the memory 227. Alternatively, the control processor 222 may modify the adaptation model 228 directly in order to improve VR performance.

As shown in FIG. 2, the remote station 202 may additionally include a separate VR engine 220 and a remote station acoustic model 226. Because of limited memory capacity, the remote station acoustic model 226 in a remote station 202 such as a wireless phone must generally be small and therefore limited to a small number of phrases or phonemes. On the other hand, because it is contained within a remote station used by a small number of users, the remote station acoustic model 226 can be optimized to one or more specific users for improved VR performance. For example, speech patterns for words like "call" and each of the ten digits may be tailored to the owner of the wireless phone. Such a local remote station acoustic model 226 enables a remote station 202 to have very good VR performance for a small set of words. Furthermore, a remote station acoustic model 226 enables the remote station 202 to accomplish VR without establishing a wireless link to the communications center 204.

The optimization of f( ) may occur through either supervised or unsupervised learning. Supervised learning generally refers to training that occurs with a user uttering a predetermined word or sentence that is used to accurately optimize a remote station acoustic model. Because the VR system has a priori knowledge of the word or sentence used as input, there is no need to perform VR during supervised learning to identify the predetermined word or sentence. Supervised learning is generally considered the most accurate way to generate an acoustic model for a specific user. An example of supervised learning is when a user first programs the speech for the ten digits into a remote station acoustic model 226 of a remote station 202. Because the remote station 202 has a priori knowledge of the speech pattern corresponding to the spoken digits, the remote station acoustic model 226 can be tailored to the particular user with less risk of degrading VR performance.

In contrast to supervised learning, unsupervised learning occurs without the VR system having a priori knowledge of the speech pattern or word being uttered. Because of the risk of matching an utterance to an incorrect speech pattern, modification of a remote station acoustic model based on unsupervised learning must be done in a much more conservative fashion. For example, many past utterances may have occurred that were similar to each other and closer to one speech pattern in the acoustic model than any other speech patterns. If all of those past utterances would be correctly matched to the one speech pattern in the model, that one speech pattern in the acoustic model could be modified to more closely match the set of similar utterances. However, if many of those past utterances do not correspond to the one speech pattern in the model, then modifying that one speech pattern would degrade VR performance. Optimally, the VR system can collect feedback from the user on the accuracy of past pattern matching, but such feedback is often not available.

Unfortunately, supervised learning is tedious for the user, making it impractical for generating an acoustic model having a large number of speech patterns. However, supervised learning may still be useful in optimizing a set of vector modification functions f( ), or even in optimizing the more limited speech patterns in an adaptation model 228. The differences in speech patterns caused by a user's strong accent is an example of an application in which supervised learning may be required. Because acoustic feature vectors may require significant modification to compensate for an accent, the need for accuracy in those modifications is great.

Unsupervised learning may also be used to optimize vector modification functions f( ) for a specific user where optimizations are less likely to be a direct cause of VR errors. For example, the adjustment in a vector modification function f( ) needed to adapt to a speaker having a longer vocal-tract length or average vocal pitch is more global in nature than the adjustments required to compensate for an accent. More inaccuracy in such global vector modifications may be made without drastically impacting VR effectiveness.

Generally, the adaptation engine 224 uses the small adaptation model 228 only to select a vector modification function f( ), and not to perform complete VR. Because of its small size, the adaptation model 228 is similarly unsuitable for performing training to optimize either the adaptation model 228 or the vector modification function f( ). An adjustment in the adaptation model 228 or vector modification function f( ) that appears to improve the degree of matching of a speaker's voice data against the adaptation model 228 may actually degrade the degree of matching against the larger central acoustic model 238. Because the central acoustic model 238 is the one actually used for VR, such an adjustment would be a mistake rather than an optimization.

In an exemplary embodiment, the remote station 202 and the communications center 204 collaborate when using unsupervised learning to modify either the adaptation model 228 or the vector modification function f( ). A decision of whether to modify either the adaptation model 228 or the vector modification model f( ) is made based on improved matching against the central acoustic model 238. For example, the remote station 202 may send multiple sets of acoustic feature vectors, the unmodified acoustic feature vectors X and the modified acoustic feature vectors f(X), to the communications center 204. Alternatively, the remote station 202 may send modified acoustic feature vectors $f_1(X)$ and $f_2(X)$, where $f_2( )$ is a tentative, improved feature vector modification function. In another embodiment, the remote station 202 sends X, and parameters for both feature vector modification functions $f_1( )$ and $f_2( )$. The remote station 202 may send the multiple sets decision of whether to send the second set of information to the communications center 204 may be based on a fixed time interval, Upon receiving multiple sets of acoustic feature information, whether modified acoustic feature vectors or parameters for feature vector modification functions, the communications center 204 evaluates the degree of matching of the resultant modified acoustic feature vectors using its own VR engine 234 and the central acoustic model 238. The communications center 204 then sends information back to the remote station 202 indicating whether a change would result in improved VR performance. For example, the communications center 204 sends a speech pattern correlation metric for each set of acoustic feature vectors to the remote station 202. The speech pattern correlation metric for a set of acoustic feature vectors indicates the degree of correlation between a set of acoustic feature vectors and the contents of the central acoustic model 238. Based on the comparative degree of correlation between the two sets of vectors, the remote station 202 may adjust its adaptation model 228 or may adjust one or more feature vector modification functions f( ). The remote station 202 may specify the use of either set of vectors to be used for actual recognition of words, or the communications center 204 may select the set of vectors based on their correlation metrics. In an alternate embodiment, the remote station 202 identifies the set of acoustic feature vectors to be used for VR after receiving the resulting correlation metrics from the communications center 204.

In an alternate embodiment, the remote station 202 uses its local adaptation engine 224 and adaptation model 228 to identify a feature vector modification function f( ), and sends the unmodified acoustic feature vectors X along with f( ) to the communications center 204. The communications center 204 then applies f( ) to X and performs testing using both modified and unmodified vectors. The communications center 204 then sends the results of the testing back to the remote station 202 to enable more accurate adjustments of the feature vector modification functions by the remote station 202.

In another embodiment, the adaptation engine 224 and the adaptation model 228 are incorporated into the communications center 204 instead of the remote station 202. A control processor 232 within the communications center 204 receives a stream of unmodified acoustic feature vectors through the modem 230 and presents them to an adaptation engine and adaptation model within the communications center 204. Based on the results of this intermediate pattern matching, the control processor 232 selects a feature vector modification function f( ) from a database stored in a communications center memory 236. In an exemplary embodiment, the communications center memory 236 includes sets of feature vector modification functions f( ) corresponding to specific users. This may be either in addition to or in lieu of feature vector modification function information stored in the remote station 202 as described above. The communications center 204 can use any of a variety of types of speaker identification information to identify the particular speaker providing the voice data from which the feature vectors are extracted. For example, the speaker identification information used to select a set of feature vector modification functions may be the mobile identification number (MIN) of the wireless phone on the opposite end of the wireless channel 206. Alternatively, the user may enter a password to identify himself for the purposes of enhanced VR services. Additionally, environment-dependent feature vector modification functions may be adapted and applied during a wireless phone call based on measurements of the speech data. Many other methods may also be used to select a set of speaker-dependent vector modification functions without departing from the scope of the embodiments described herein.

One skilled in the art would also recognize that the multiple pattern matching engines 220, 224 within the remote station 202 may be combined without departing from the scope of the embodiments described herein. In addition, the different acoustic models 226, 228 in the remote station 202 may be similarly combined. Furthermore, one or more of the pattern matching engines 220, 224 may be incorporated into the control processor 222 of the remote station 202. Also, one or more of the acoustic models 226, 228 may be incorporated into the memory 227 used by the control processor 222.

In the communications center 204, the central speech pattern matching engine 234 may be combined with an adaptation engine (not shown), if present, without departing from the scope of the embodiments described herein. In addition, the central acoustic models 238 may be combined with an adaptation model (not shown). Furthermore, either or both of the central speech pattern matching engine 234 and the adaptation engine (not shown), if present in the communications center 204, may be incorporated into the control processor 232 of the communications center 204. Also, either or both of the central acoustic model 238 and the adaptation model (not shown), if present in the communications center 204, may be incorporated into the control processor 232 of the communications center 204.

Figure 3:
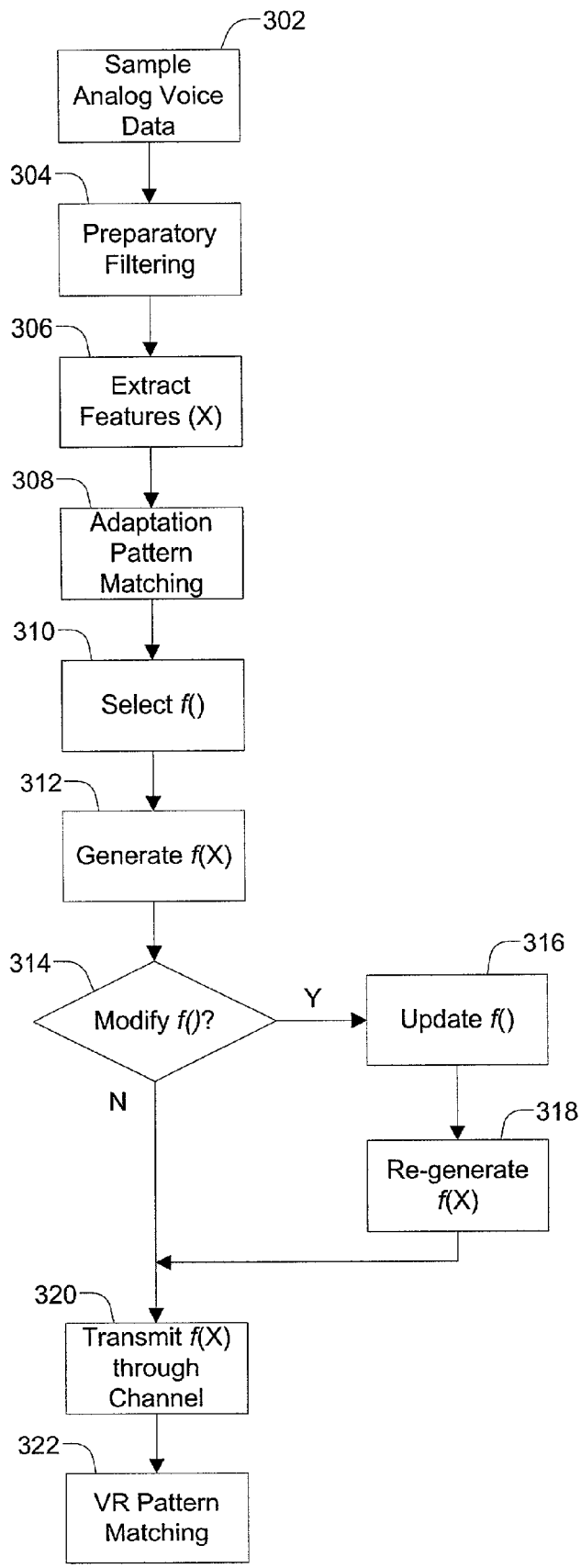
FIG. 3 is a flowchart showing a method for performing distributed VR wherein acoustic feature vector modification and selection of feature vector modification functions occur entirely in the remote station.

FIG. 3 is a flowchart of a method for performing distributed VR where modifications of X and f( ) occur entirely in the remote station 202 based on convergence with a remote adaptation model. At step 302, the remote station 202 samples the analog voice signals from a microphone to produce a stream of digital voice samples. At step 304, the speech samples are then filtered, for example using a preemphasis filter as described above. At step 306, a stream of acoustic feature vectors X is extracted from the filtered speech samples. As described above, the acoustic feature vectors may be extracted from either overlapping or non-overlapping intervals of speech samples that are either fixed or variable in duration.

At step 308, the remote station 202 performs pattern matching to determine the degree of correlation between the stream of acoustic feature vectors and multiple patterns contained in an adaptation model (such as 228 in FIG. 2). At step 310, the remote station 202 selects the pattern in the adaptation model that most closely matches the stream of acoustic feature vectors X. The selected pattern is called the target pattern. As discussed above, the degree of correlation between X and the target pattern may be compared against a detection threshold. If the degree of correlation is greater than the detection threshold, then the remote station 202 selects a feature vector modification function f( ) that corresponds to the target pattern. If the degree of correlation is less than the detection threshold, then the remote station 202 selects either an acoustic feature vector identity function f( ) such that f(X)=X, or selects some default f( ). In an exemplary embodiment, remote station 202 selects a feature vector modification function f( ) from a local database of feature vector modification functions corresponding to various patterns in its local adaptation model. The remote station 202 applies the selected feature vector modification function f( ) to the stream of acoustic feature vectors X at step 312, thus producing f(X).

In an exemplary embodiment, the remote station 202 generates a correlation metric that indicates the degree of correlation between X and the target pattern. The remote station 202 also generates a correlation metric that indicates the degree of correlation between f(X) and the target pattern. In an example of unsupervised learning, the remote station 202 uses the two correlation metrics along with past correlation metric values to determine, at step 314, whether to modify one or more feature vector modification functions f( ). If a determination is made at step 314 to modify f( ), then f( ) is modified at step 316. In an exemplary embodiment, the modified f( ) is immediately applied to X at step 318 to form a new modified acoustic feature vector f(X). In an alternate embodiment, step 318 is omitted, and a new feature vector modification function f( ) does not take effect until a later set of acoustic feature vectors X.

If a determination is made at step 314 not to modify f( ), or after steps 316 and 318, the remote station 202 transmits the current f(X) through the wireless channel 206 to the communications center 204 at step 320. VR pattern matching then takes place within the communications center 204 at step 322.

In an alternate embodiment, the communications center 204 generates speech pattern correlation metrics during the VR pattern matching step 322 and sends these metrics back to the remote station 302 to aid in optimizations of f( ). The speech pattern correlation metrics may be formatted in any of several ways. For example, the communications center 204 may return an acoustic feature vector modification error function $f_E()$ that can be applied to f(X) to create an exact correlation with a pattern found in a central acoustic model. Alternatively, the communications center 204 could simply return a set of acoustic feature vectors corresponding to a target pattern or patterns in the central acoustic model found to have the highest degree of correlation with f(X). Or, the communications center 204 could return the branch metric derived from the hard-decision or soft-decision Viterbi decoding process used to select the target pattern. The speech pattern correlation metrics could also include a combination of these types of information. This returned information is then used by the remote station 202 in optimizing f( ). In an exemplary embodiment, re-generation of f(X) at step 318 is omitted, and the remote station 202 performs modifications of f( ) (steps 314 and 316) after receiving feedback from the communications center 204.

Figure 4:
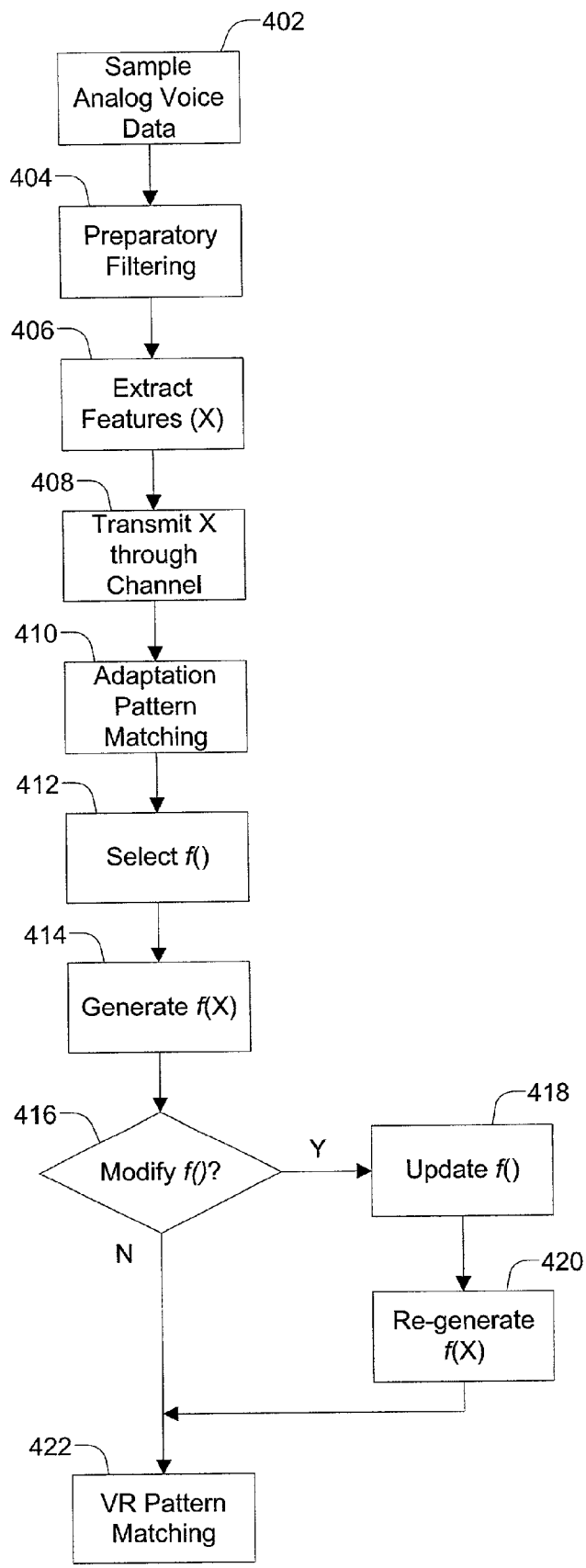
FIG. 4 is a flowchart showing a method for performing distributed VR wherein acoustic feature vector modification and selection of feature vector modification functions occur entirely in the communications center.

FIG. 4 is a flowchart showing a method for performing distributed VR where modifications of X and f( ) occur entirely in the communications center 204 based on correlation with a central acoustic model. At step 402, the remote station 202 samples the analog voice signals from a microphone to produce a stream of digital voice samples. At step 404, the speech samples are then filtered, for example using a preemphasis filter as described above. At step 406, a stream of acoustic feature vectors X is extracted from the filtered speech samples. As described above, the acoustic feature vectors may be extracted from either overlapping or non-overlapping intervals of speech samples that are either fixed or variable in duration.

At step 408, the remote station 202 transmits the unmodified stream of acoustic feature vectors X through the wireless channel 206. At step 410, the communications center 204 performs adaptation pattern matching. As discussed above, adaptation pattern matching may be accomplished using either a separate adaptation model or using a large central acoustic model 238. At step 412, the communications center 204 selects the pattern in the adaptation model that most closely matches the stream of acoustic feature vectors X. The selected pattern is called the target pattern. As described above, if the correlation between X and the target pattern exceeds a threshold, an f( ) is selected that corresponds to the target pattern. Otherwise, a default f( ) or a null f( ) is selected. At step 414, the selected feature vector modification function f( ) is applied to the stream of acoustic feature vectors X to form a modified stream of acoustic feature vectors f(X).

In an exemplary embodiment, a feature vector modification function f( ) is selected from a subset of a large database of feature vector modification functions residing within the communications center 204. The subset of feature vector modification functions available for selection are speaker-dependent, such that pattern matching using a central acoustic model (such as 238 in FIG. 2) will be more accurate using f(X) as input than X. As described above, examples of how the communications center 204 may select a speaker-dependent subset of feature vector modification functions include use of a MIN of the speaker's wireless phone or a password entered by a speaker.

In an exemplary embodiment, the communications center 204 generates correlation metrics for the correlation between X and the target pattern and between f(X) and the target pattern. The communications center 204 then uses the two correlation metrics along with past correlation metric values to determine, at step 416, whether to modify one or more feature vector modification functions f( ). If a determination is made at step 416 to modify f( ), then f( ) is modified at step 418. In an exemplary embodiment, the modified f( ) is immediately applied to X at step 420 to form a new modified acoustic feature vector f(X). In an alternate embodiment, step 420 is omitted, and a new feature vector modification function f( ) does not take effect until a later set of acoustic feature vectors X.

If a determination is made at step 416 not to modify f( ), or after steps 418 and 420, the communications center 204 performs VR pattern matching at step 422 using a central acoustic model 238.

Figure 5:
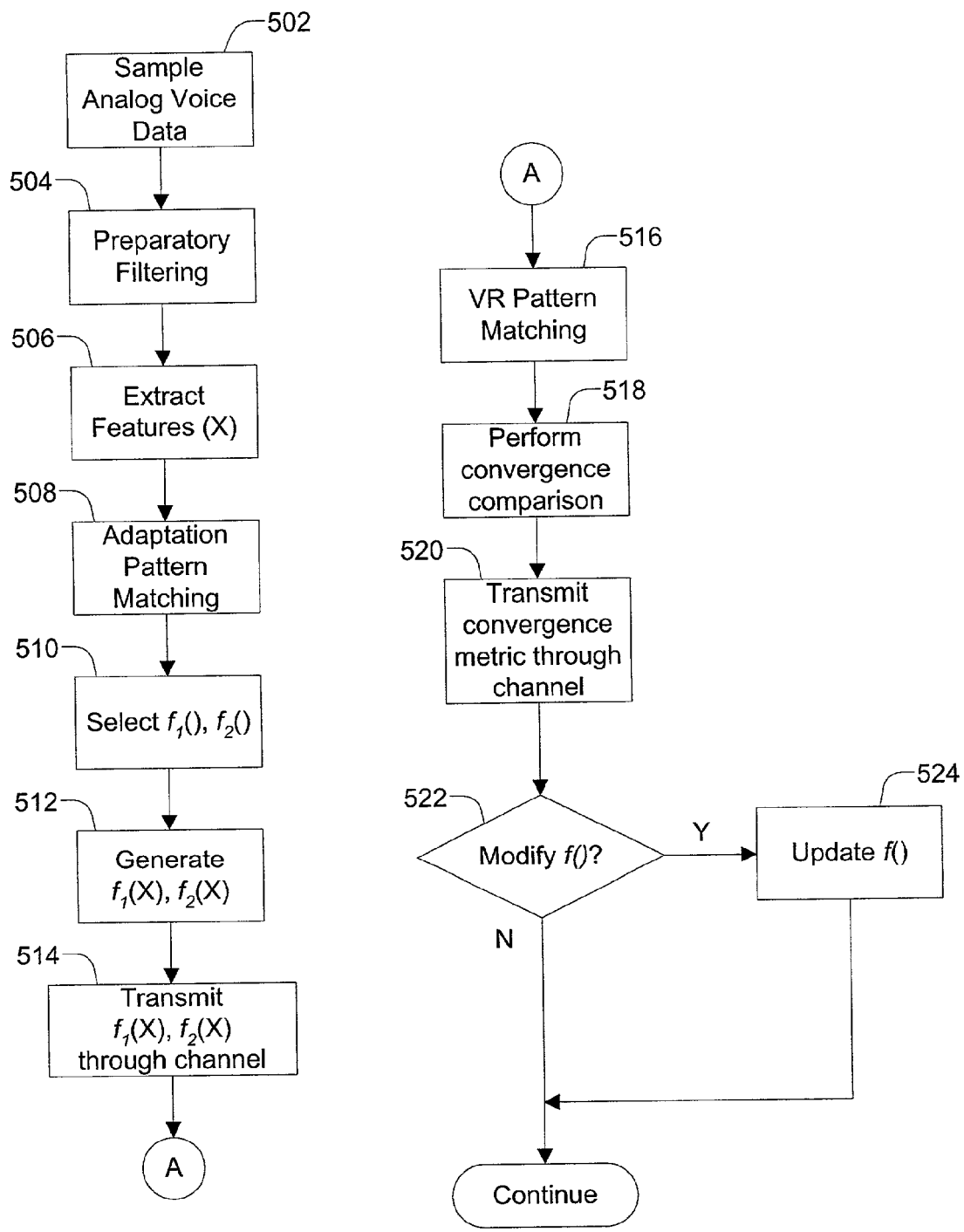
FIG. 5 is a flowchart showing a method for performing distributed VR wherein a central acoustic model is used to optimize feature vector modification functions or adaptation models.

FIG. 5 is a flowchart showing a method for performing distributed VR wherein a central acoustic model within the communications center 204 is used to optimize feature vector modification functions or adaptation models. In an exemplary embodiment, the remote station 202 and the communications center 204 exchange information as necessary and collaborate to maximize the accuracy of optimizations of feature vector modification functions.

At step 502, the remote station 202 samples the analog voice signals from a microphone to produce a stream of digital voice samples. At step 504, the speech samples are then filtered, for example using a preemphasis filter as described above. At step 506, a stream of acoustic feature vectors X is extracted from the filtered speech samples. As described above, the acoustic feature vectors may be extracted from either overlapping or non-overlapping intervals of speech samples that are either fixed or variable in duration.

At step 508, the remote station 202 performs pattern matching to determine the degree of correlation between the stream of acoustic feature vectors and multiple patterns contained in an adaptation model (such as 228 in FIG. 2). At step 510, the remote station 202 selects the pattern in the adaptation model that most closely matches the stream of acoustic feature vectors X. The selected pattern is called the target pattern. As described above, if the correlation between X and the target pattern exceeds a threshold, a first feature vector modification function $f_1( )$ is selected that corresponds to the target pattern. Otherwise, a default f( ) or a null f( ) is selected. The remote station 202 selects the feature vector modification function f( ) from a local database of feature vector modification functions corresponding to various patterns in its local adaptation model. The remote station 202 applies the selected feature vector modification function f( ) to the stream of acoustic feature vectors X at step 512, thus producing f(X).

In contrast to the methods described in association with FIG. 3 and FIG. 4, at step 514, the remote station 202 sends two sets of acoustic feature vectors, $f_1(X)$ and $f_2(X)$, through the channel 206 to the communications center 204. At step 516, the communications center 204 performs pattern matching against its central acoustic model using $f_1(X)$ as input. As a result of this VR pattern matching, the communications center 204 identifies a target pattern or set of patterns having the greatest degree of correlation with $f_1(X)$. At step 518, the communications center 204 generates a first speech pattern correlation metric indicating the degree of correlation between $f_1(X)$ and the target pattern and a second speech pattern correlation metric indicating the degree of correlation between $f_2(X)$ and the target pattern.

Though both sets of acoustic feature vectors are used for pattern matching against the central acoustic model, only one set is used for actual VR. Thus, the remote station 202 can evaluate the performance of a proposed feature vector modification function without risking an unexpected degradation in performance. Also, the remote station 202 need not rely entirely on its smaller, local adaptation model when optimizing f( ). In an alternate embodiment, the remote station 202 may use a null function for $f_2( )$, such that $f_2(X)=X$. This approach allows the remote station 202 to verify the performance of f( ) against VR performance achieved without acoustic feature vector modification.

At step 520, the communications center 204 sends the two speech pattern correlation metrics back to the remote station 202 through the wireless channel 206. Based on the received speech pattern correlation metrics, the remote station 202 determines, at step 522, whether to modify $f_1( )$ at step 524. The determination of whether to modify $f_1(X)$ at step 522 may be based on one set of speech pattern correlation metrics, or may be based on a series of speech pattern correlation metrics associated with the same speech patterns from the local adaptation model. As discussed above, the speech pattern correlation metrics may include such information as an acoustic feature vector modification error function $f_E( )$, a set of acoustic feature vectors corresponding to patterns in the central acoustic model found to have had the highest degree of correlation with f(X), or a Viterbi decoding branch metric.

One skilled in the art will recognize that the techniques described above may be applied equally to any of a variety of types of wireless channel 206. For example, the wireless channel 206 (and accordingly the modems 218, 230) may utilize code division multiple access (CDMA) technology, analog cellular, time division multiple access (TDMA), or other types of wireless channel. Alternatively, the channel 206 may be a type of channel other than wireless, including but not limited to optical, infrared, and ethernet channels. In yet another embodiment, the remote station 202 and communications center 204 are combined into a single system that performs speaker-dependent modification of acoustic feature vectors prior to VR testing using a central acoustic model 238, obviating the channel 206 entirely.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A remote station apparatus comprising:
   an adaptation model containing acoustic pattern information;
   an adaptation engine configured to perform pattern matching of acoustic feature vectors against the acoustic pattern information to identify a selected feature vector modification function, and configured to apply the selected feature vector modification function to the acoustic feature vectors to produce a set of modified acoustic feature vectors for processing by a voice recognition engine using a central acoustic model larger than the adaptation model;
   a control processor for evaluating the performance of the selected feature vector modification function and adjusting the selected feature vector modification function based on the evaluating; and
   a communications interface for communicating the modified acoustic feature vectors to the voice recognition engine.

2. The remote station apparatus of claim 1 further comprising a memory for storing at least one set of parameters corresponding to a set of feature vector modification functions, wherein the selected feature vector modification function is a member of the set of feature modification functions.

3. The remote station apparatus of claim 2 wherein the memory contains more than one set of parameters corresponding to a set of feature vector modification functions, and wherein each set of parameters corresponds to a specific speaker.

4. The remote station apparatus of claim 2 wherein the memory contains more than one set of parameters corresponding to a set of feature vector modification functions, and wherein each set of parameters corresponds to a different acoustic environment.

5. A method comprising:
   retrieving, from an adaptation model, acoustic pattern information;
   performing, using an adaptation engine, pattern matching of acoustic feature vectors against the acoustic pattern information to identity a selected feature vector modification function;
   applying, by the adaptation engine, the selected feature vector modification function to the acoustic feature vectors to produce a set of modified acoustic feature vectors for processing by a voice recognition engine using a central acoustic model larger than the adaptation model;
   evaluating the performance of the selected feature vector modification function and adjusting the selected feature vector modification function based on the evaluating; and
   communicating the modified acoustic feature vectors to the voice recognition engine.

6. The method of claim 5, further comprising: storing, in memory, at least one set of parameters corresponding to a set of feature vector modification functions, wherein the selected feature vector modification function is a member of the set of feature modification functions.

7. The method of claim 6, wherein the memory contains more than one set of parameters corresponding to a set of feature vector modification functions, and wherein each set of parameters corresponds to a specific speaker.

8. The method of claim 6, wherein the memory contains more than one set of parameters corresponding to a set of feature vector modification functions, and wherein each set of parameters corresponds to a different acoustic environment.

* * * * *